United States Patent
Correa

(10) Patent No.: US 8,225,293 B2
(45) Date of Patent: *Jul. 17, 2012

(54) METHOD FOR SUPPORTING CALIBRATION PARAMETERS IN AN ECU

(75) Inventor: Colt R Correa, Commerce, MI (US)

(73) Assignee: Accurate Technologies Inc., Wixom, MI (US)

(*) Notice: Subject to any disclaimer, the term of this patent is extended or adjusted under 35 U.S.C. 154(b) by 1285 days.

This patent is subject to a terminal disclaimer.

(21) Appl. No.: 10/978,804

(22) Filed: Nov. 1, 2004

(65) Prior Publication Data

US 2005/0060522 A1 Mar. 17, 2005

Related U.S. Application Data

(63) Continuation-in-part of application No. 10/366,167, filed on Feb. 13, 2003, now abandoned.

(51) Int. Cl.
*G06F 9/44* (2006.01)
*G06F 11/00* (2006.01)

(52) U.S. Cl. ............ 717/130; 717/131; 714/35

(58) Field of Classification Search ......... 717/110–113, 717/124–135; 714/32, 35
See application file for complete search history.

(56) References Cited

U.S. PATENT DOCUMENTS

| | | | | |
|---|---|---|---|---|
| 4,910,663 A * | 3/1990 | Bailey | | 714/34 |
| 5,446,900 A | 8/1995 | Kimelman | | |
| 5,555,417 A * | 9/1996 | Odnert et al. | | 717/159 |
| 5,568,388 A * | 10/1996 | Schnerer et al. | | 701/1 |
| 5,590,296 A * | 12/1996 | Matsuo | | 712/229 |
| 5,619,698 A * | 4/1997 | Lillich et al. | | 717/168 |
| 5,701,500 A * | 12/1997 | Ikeo et al. | | 715/517 |
| 5,732,210 A | 3/1998 | Buzbee | | 714/38 |
| 5,857,093 A | 1/1999 | Bradford | | 703/21 |
| 5,859,963 A * | 1/1999 | O'Dowd et al. | | 714/38 |
| 5,901,225 A | 5/1999 | Ireton et al. | | 714/7 |
| 5,911,073 A | 6/1999 | Mattson et al. | | 717/104 |
| 5,940,016 A * | 8/1999 | Lee | | 341/67 |
| 5,958,963 A | 9/1999 | Nguyen et al. | | 514/404 |
| 5,999,730 A | 12/1999 | Lewis | | |
| 6,134,707 A | 10/2000 | Herrmann et al. | | 717/139 |
| 6,289,507 B1 | 9/2001 | Tanaka et al. | | 717/155 |
| 6,550,052 B1 * | 4/2003 | Joyce et al. | | 717/100 |
| 6,553,565 B2 * | 4/2003 | Click et al. | | 717/129 |

(Continued)

OTHER PUBLICATIONS

Bortolazzi et al., "Specification and Design of Electronic Control Units," Sep. 1996, IEEE.*

(Continued)

*Primary Examiner* — Wei Zhen
*Assistant Examiner* — Qing Chen
(74) *Attorney, Agent, or Firm* — Harness, Dickey & Pierce, PLC

(57) ABSTRACT

A method is provided for controlling ROM parameters embedded in a microprocessor software executable without modifications to the underlying source code. The method includes: presenting a software program having a plurality of machine instructions of a finite number of fixed lengths in an executable form; searching through the machine instructions of the executable and finding at least one appropriate instruction defined in a read only memory space to replace; defining a replacement instruction for identified machine instructions in the software program; and replacing identified machine instructions in the executable form of the software program with the replacement instruction. The replacement instruction may be further defined as a branch instruction that references an address outside an address space for the software program.

6 Claims, 6 Drawing Sheets

U.S. PATENT DOCUMENTS

| | | | | |
|---|---|---|---|---|
| 6,701,515 | B1* | 3/2004 | Wilson et al. | 717/117 |
| 6,976,245 | B2 | 12/2005 | Takayama et al. | 717/127 |
| 7,134,115 | B2* | 11/2006 | Kawai et al. | 717/124 |
| 7,137,105 | B2* | 11/2006 | Madsen et al. | 717/128 |
| 7,168,068 | B2* | 1/2007 | Dawson | 717/130 |
| 2003/0061598 | A1 | 3/2003 | Karp et al. | 717/129 |
| 2003/0110351 | A1* | 6/2003 | Blood et al. | 711/111 |
| 2004/0205720 | A1* | 10/2004 | Hundt | 717/124 |

OTHER PUBLICATIONS

Hunt et al., "Detours: Binary Interception of Win32 Functions," Jul. 1999, USENIX, p. 1-9.*

Wilson et al., "ASDEN: A Comprehensive Design Framework Vision for Automotive Electronic Control Systems," May 2000, ACM, p. 152-156.*

Demmeler et al., "A Universal Communication Model for an Automotive System Integration Platform," Mar. 2001, IEEE, p. 47-54.*

Kessler, P.B.: "Fast Breakpoints: Design and Implementation" SIGPLAN Notices, Association for Computing Machinery, New York, NY, US vol. 25, No. 6, Jun. 20, 1990, pp. 78-84, XP000619455 ISSN: 0362-1340.

Anonymous: "Rapid algorithm development via overlay RAM" Research Disclosure, Mason Publications, Hampshire, GB, vol. 460, No. 7, Aug. 2002, XP007130945 ISSN: 0374-4353.

Eppinger, A: "ASCET—computer aided simulation of engine functions" IEE Colloquium on Computer Aided Engineering of Automotive Electronics, Apr. 27, 1994, pp. 5/1-5/13, XP006519405.

Hanselmann, H.: "Automotive control: from concept to experiment to product" Computer-Aided Control System Design, 1996. Proceedings of the 1996 IEEE International Symposium on Dearborn, MI, USA Sep. 15-18, 1996, New York, NY, USA, IEEE, US Sep. 15, 1996, pp. 129-134, XP010198777 ISBN: 0-7803-3032-3.

Smith M H et al: "Towards a more efficient approach to automotive embedded control system development" Computer Aided Control System Design, 1999. Proceedings of the 1999 IEEE International Symposium on Kohala Coast HI, USA Aug. 22-27, 1999, Piscataway, NJ, USA, IEEE, US, Aug. 22, 1999, pp. 219-224, XP010360469 ISBN: 0-7803.5500-8.

Buck B et al: "An API for runtime code patching" International Journal of High Performance Computing Applications Sage Science Press USA, vol. 14, No. 4, Nov. 2000, pp. 317-329, XP008079534 USA ISSN: 1078-3482.

* cited by examiner

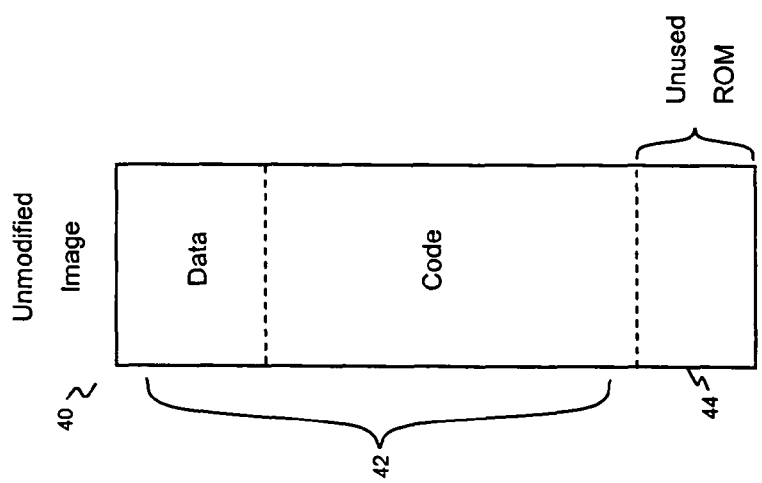
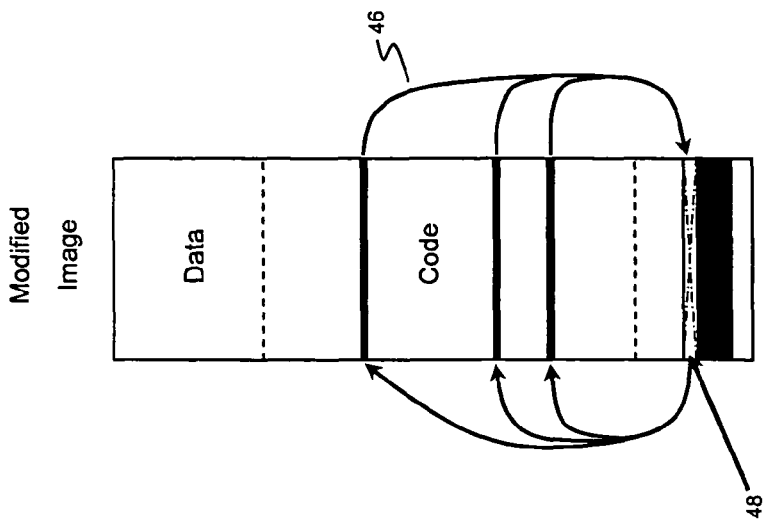

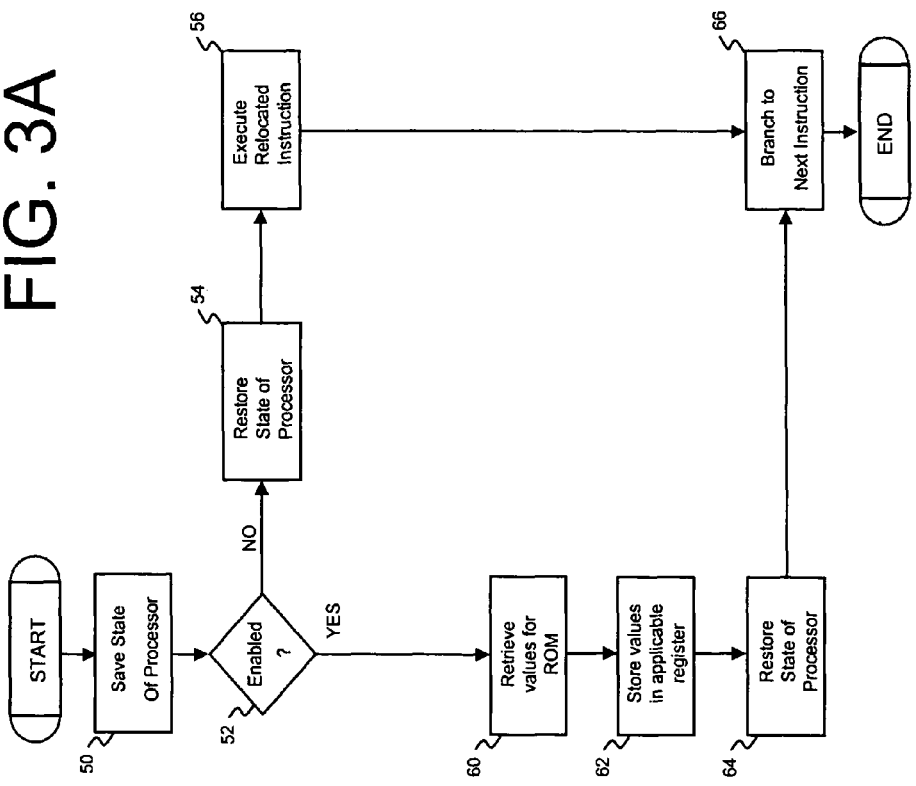

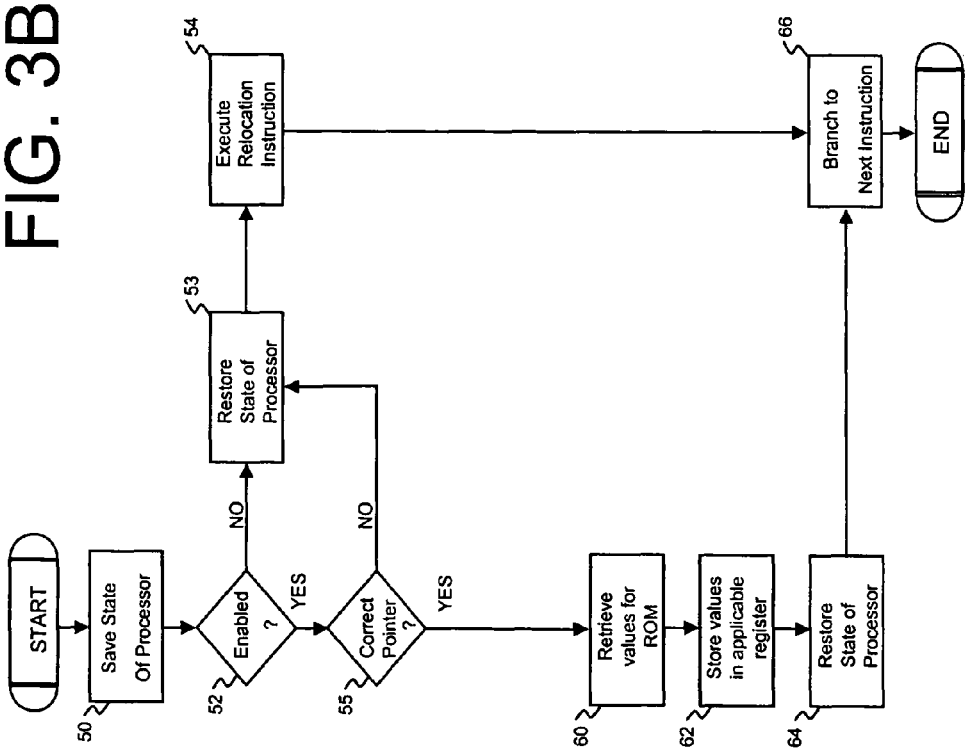

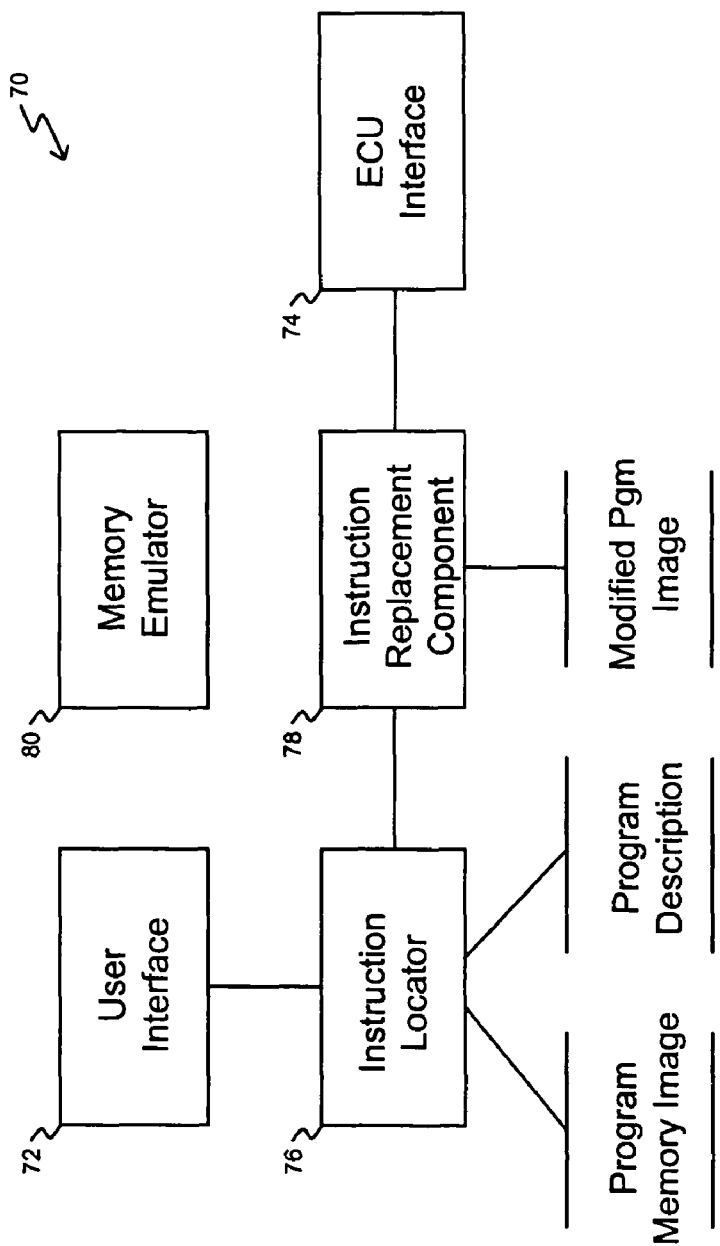

METHOD FOR SUPPORTING CALIBRATION PARAMETERS IN AN ECU

CROSS-REFERENCE TO RELATED APPLICATIONS

This application is a continuation-in-part of U.S. patent application Ser. No. 10/366,167 filed on Feb. 13, 2003. The disclosure of the above application is incorporated herein by reference.

FIELD OF THE INVENTION

The present invention relates generally to an electronic control unit (ECU) calibration and diagnostics development and, more particularly, to a technique that enables calibration tools to control the value of user selected read only memory (ROM) parameters without any modifications or access to the underlying ECU source code.

BACKGROUND OF THE INVENTION

Powertrain calibration is a term used in the automotive industry to denote the process of modifying ECU (Electronic Control Unit) software constants to adapt an electronic control system to new requirements (emissions, safety, etc), a new plant system (the engine or transmission) or any combination thereof. Generally to perform powertrain calibration, automotive companies purchase commercially available calibration systems from companies like Accurate Technologies Inc. (ATI), dSPACE GmbH, ETAS GmbH or Vector GmbH. In order to support the modification of software constants, without the need to continuously FLASH the ECU whenever a constant stored in FLASH memory is changed, one of several methods is generally used. The methods currently used require additional hardware like a M5 memory emulator from Accurate Technologies Inc. or special source code support in the underlying source code for the ECU.

In modern automotive electronic control units, there exist a number of embedded control algorithms that control different aspects of the vehicle. For instance, there may be an algorithm that controls the amount of fuel injected into the cylinders and a different control algorithm that is responsible for shifting gears in the transmission. These algorithms are developed in a way that they can be used on many different vehicle types, engines, and transmission for a variety of markets with different emission and safety requirements. During real-time execution, each of these algorithms use what is termed "calibrations" or "parameters" to adapt itself to the vehicle and requirements that it is controlling.

IC2 or InCuruit2 is a commonly employed technique for calibrating parameters in an ECU. Prior to starting a calibration session, the IC2 technique requires the user to select the desired parameters for calibration. In operation, a calibration tool commands the ECU to stop using the calibration values stored in FLASH (reference calibration) and begin referencing new values that are stored in RAM (working calibration). In addition, the calibration tool must flash the modified pointer table values every time the desired list of calibration parameters change. Exemplary calibration tools includes the VISION calibration tool commercially available from Accurate Technologies and the INCA calibration tool commercially available from ETAS GmbH.

More specifically, this calibration technique is based on a pointer table embedded in the software. For each calibration parameter, there is an entry in the point table. When the ECU is in a reference mode, all calibration parameters are read directly from FLASH. When the ECU is in a working mode, the ECU software first looks up an address for a calibration parameter in the pointer table and then uses this address to access the calibration data. The calibration tool is responsible for setting the appropriate address in the calibration pointer table. If a calibration parameter is active (meaning its an adjustable value located in RAM), the calibration tool must set the pointer entry in the pointer table for the parameter to point to RAM rather than FLASH. Calibration parameters that are not active have their associated pointer entries point to the values in FLASH. To enable this approach, suitable instructions are embedded in the ECU software.

Therefore, it is desirable to provide a technique that enables calibration of read only calibration parameters without any modifications or access to the underlying ECU source code.

SUMMARY OF THE INVENTION

In accordance with the present invention, a method is provided for controlling one or more ROM parameters in a microprocessor without modifications to the underlying source code. The method includes: presenting an software program having a plurality of machine instructions of a finite number of fixed lengths in an executable form; searching through the machine instructions of the executable and finding at least one appropriate instruction to replace, where the instruction reads a parameter defined in read only memory; defining a replacement instruction for identified machine instructions in the software program; and replacing identified machine instructions in the executable form of the software program with the replacement instruction. In one aspect of the present invention, the replacement instruction is further defined as a branch instruction that references an address outside an address space for the software program.

For a more complete understanding of the invention, its objects and advantages, reference may be had to the following specification and to the accompanying drawings.

BRIEF DESCRIPTION OF THE DRAWINGS

FIG. 2A is a diagram illustrating an unmodified program memory image for a target software program embedded in a microprocessor;

FIG. 2B is a diagram illustrating a program memory image modified in accordance with the present invention;

FIGS. 3A and 3B are flowcharts illustrating exemplary embodiments of relocation code in accordance with the present invention;

FIG. 4 is a diagram depicting an exemplary embodiment of a calibration tool that is configured to support the present invention.

DETAILED DESCRIPTION OF THE PREFERRED EMBODIMENTS

In accordance with the present invention, a method is provided for controlling one or more ROM parameters in an executable software program embedded in a microprocessor without modifications to the underlying source code. While the following description is provided with reference to ROM parameters, it is readily understood that this technique is also applicable to manipulating any portion of the read only memory space associated with the software program.

Figure 1:
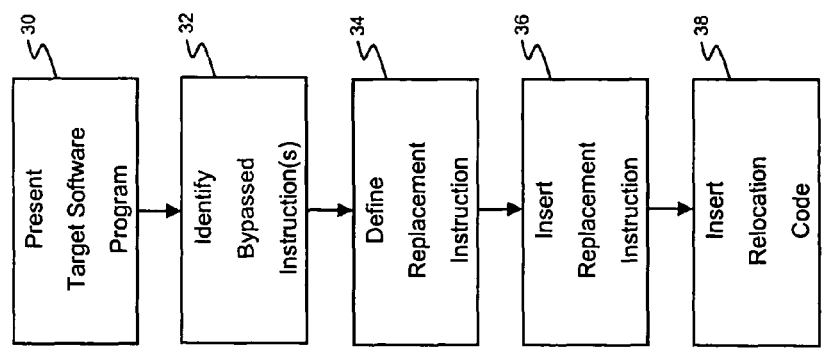
FIG. 1 is a flowchart illustrating a method for relocating a calibration parameter normally located in read only memory in a microprocessor without modifications to the underlying source code in accordance with the present invention.

Referring to FIG. 1, the target software program is provided at step 30 in an executable form that is defined by a plurality of machine instructions of a finite quantity of fixed lengths. In many conventional microprocessors, machine instructions are limited to a finite quantity of fixed lengths. For example, machine instructions in a PowerPC-based processor are 32 bits in length; whereas Tri-Core and ST10 processors have machine instructions that are 16 bits and 32 bits in length. Thus, some machine instructions in the underlying software may be replaced with other machine instructions. Although this concept serves as the basis for the present invention, it is readily understood that the broader aspects of the present invention may be extended to microprocessors having machine instructions of a varied length.

To manipulate a given ROM parameter, one or more machine instructions having access to the parameter are replaced with replacement instructions. Machine instructions to be replaced are first identified at step 32. These machine instructions are referred to herein as relocated instructions. Identification of a machine instruction includes determining a location or address for the machine instruction inside the software executable as further described below.

In the preferred embodiment, the relocated instructions are preferably machine instructions that access parameters that correspond to the ROM parameters that are desired to be controlled. For instance, since there are no machine instructions that directly modify the memory space of a PowerPC-based processor, the code must load the value of the parameter into a register. Thus, in a PowerPC-based processor, the relocated instructions for ROM parameter are specifically designated as load instructions for the applicable parameters in the target software. However, it is readily understood that other types of machine instructions may also serve as relocated instructions.

Next, an appropriate replacement instruction is defined at step 34 for each of the identified machine instruction. Each replacement instruction is preferably defined as a branch instruction that references an address outside the memory space for the target software program. In the preferred embodiment, branch instructions pass processing control to a series of machine instructions that are defined in the unused portion of the memory space and are referred to herein as relocation code. Relocation code is responsible for obtaining the desired value for the given ROM parameter and writing this value into a RAM location associated with the relocated ROM parameter as further described below.

Alternatively, it is envisioned that replacement instructions may be defined as instructions that cause an interrupt or an exception to occur in the microprocessor. For example, PowerPC-based processors provide a "sc" command to perform this function; whereas ST10-based processors provide a "trap" instruction to perform this function. Although these types of instructions provide an alternative technique for branching to a different address space, this approach is generally not preferred because these types of instructions may interfere with the normal operation of the microprocessor.

The identified machine instructions of the target software program are then replaced at step 36 with replacement instructions. Specifically, replacement instruction are inserted into the program memory image of the software program at the identified address. Lastly, the relocation code is also inserted at step 38 at a location outside the software executable program space.

FIG. 2A illustrates an unmodified program memory image 40 for a target software program embedded in a microprocessor. The memory space may be partitioned into an address space 42 for the target software program and an unused portion 44 of memory space. It is readily understood that the address space 42 for the target software program may be further partitioned into a data portion and a code portion.

FIG. 2B illustrates a program memory image modified in accordance with the present invention. One or more relocated instructions designated at 46 may be replaced with replacement instructions. Replacement instructions in turn pass processing control to relocation code 48 that is defined in a memory space outside of the memory space for the target software program.

FIGS. 3A and 3B are flowcharts that illustrate exemplary embodiments of relocation code in accordance with the present invention. In general, the relocation code performs four primary functions. Referring to FIG. 3A, the relocation code initially determines if the relocation feature is enabled or disabled as shown at step 52. When the relocation feature is disabled, the relocation code executes the relocated instruction as shown at step 56; and then processing branches at step 66 to the machine instruction following the relocated instruction in the target software program.

On the other hand, when the relocation feature is enabled, the relocation code performs the following functions. The relocation code reads the desired value of the ROM parameter at step 60 from a location which may be modified by the calibration system. For calibration system that are not employing a memory emulator, this location is typically a RAM location. The relocation code then stores the desired value at step 62 into the original machine register where the ROM value was read into. In this way, other machine instructions in the target software program will access the desired value for the calibration parameter.

Lastly, the relocation code branches processing at step 66 to the machine instruction following the relocated instruction in the target software program. The relocation code described above assumes a direct addressing method of reading ROM parameter values. In other words, each machine instruction that reads the value of a parameter contains the address information needed to access that parameter in memory.

In some instances, an indirect addressing method may be employed for loading parameter values. Indirect addressing first loads the address of a ROM parameter into a machine register, and then uses the register to load the value of the parameter. Thus, it is not possible to directly determine what load instructions are associated with a given parameter. For these types of instructions, the present invention determines the machine register used as the pointer to the parameter and then searches, starting from the specified instruction, for all store instruction using that register. The search includes all instructions in the current function (or routine) as well as all function that may be called by the function. In this way, all instructions that have the possibility of being load instructions for the given parameter are modified. With this method, it is possible to modify a load instruction that is not associated with the given parameter.

Relocation code for an indirect addressing method of reading parameter values is shown in FIG. 3B. In this case, it is necessary for the relocation code to determine that the value of the register is in fact pointing to the given parameter as shown at step 55; otherwise the relocation code is in a manner as set forth in relation to FIG. 3A.

Conventional calibration tools may be configured to support the present invention as shown in FIG. 4. Calibration tools are generally configured to calibrate and test software-implemented control algorithms which may be embedded in an automotive electronic control unit (ECU). Exemplary calibration tools are commercially available from Accurate Technologies Inc., dSPACE GmbH, ETAS GmbH, and Vector GmbH. While the following description is provided with reference to control algorithms embedded in an automotive electronic control unit, it is readily understood that the broader aspects of the present invention are applicable to other types of software applications which are embedded in microprocessors.

The calibration tool 70 is generally comprised of a user interface 72, an ECU interface 74 and, optionally a memory emulator 80. A user configures the calibration environment through the use of the user interface 72. In general, the user interface may be used to specify the target software program and the ROM parameters that are desired to be controlled. In addition, the user may further specify the machine instructions which are to be relocated as well as the corresponding replacement instructions. One skilled in the art will readily recognize that a suitable user interface may be designed to support these required functions of the present invention.

In accordance with the present invention, the calibration tool 70 may be further configured to include an instruction locator 76 and an instruction replacement component 78. The instruction locator 76 is adapted to receive a specified ROM parameter address and data type within a target software program, and operable to identify location information for the machine instructions associated with reads of the ROM address within the executable form of the target software program. In one exemplary embodiment, the instruction locator 76 searches through the application image (hex record) for the target software and parses each machine instruction therein. For Embedded Application Binary Interface (EABI) compliant compilers, load instructions can be identified in the application image. In PowerPC-based processors, running software that is EABI compliant, registers must be used in specific ways. For example, R13 must be used to point to the small data area for read/write memory. This register normally is used to index to the internal random access memory of the processor. Using this specific information, the instruction locator has the ability to reverse calculate an address for any load instruction in the small data area.

Another example for obtaining address information from an instruction is using machine register R2. This register normally contains a pointer to read only memory in the address space of the target processor. Sometimes pointers or address values are stored in the read only memory to store the location of certain RAM variables or ROM parameters. It is possible to interpret a load or read instruction that uses the R2 register and determine what address is being read or loaded. In this way, the instruction locator as defined later, can also read the read only address containing address or pointer information. It is readily understood that other techniques for identifying location information for a specific machine instruction are within the broader aspects of the present invention.

The instruction replacement component 78 is then operable to replace the specified machine instruction with a replacement instruction. To do so, the instruction replace component 78 is adapted to receive the replacement instruction and then insert the replacement instruction into a program memory image of the software program at the identified address. In the exemplary embodiment, the instruction replacement component 78 also generates the applicable relocation code and inserts the relocation code into an unused portion of the memory space on the target microprocessor.

The modified program memory image is then FLASHED or downloaded into the ECU for execution. During execution, the replacement instructions are executed in place of the original machine instructions which accessed a given ROM parameter. In this way, the ROM parameter is being controlled by the calibration tool in a manner different than was originally contemplated by the ECU. In one exemplary embodiment, the calibration tool includes an ECU interface 74 which is operable to download the modified program memory image into the ECU. However, it is readily understood that other techniques may be employed to FLASH the ECU. Moreover, it is to be understood that only the relevant steps of the process are discussed herein, but that other software-implemented features may be needed to manage and control the overall calibration tool.

In order to access constants within a control algorithm embedded in a read-only memory space, it is envisioned that the calibration tool may also employ a memory emulator 80 or other interface to the ECU, such as CCP (Can Calibration Protocol). A suitable memory emulator is the M5 memory emulator which is commercially available from the Accurate Technologies, Inc.

Figure 5:
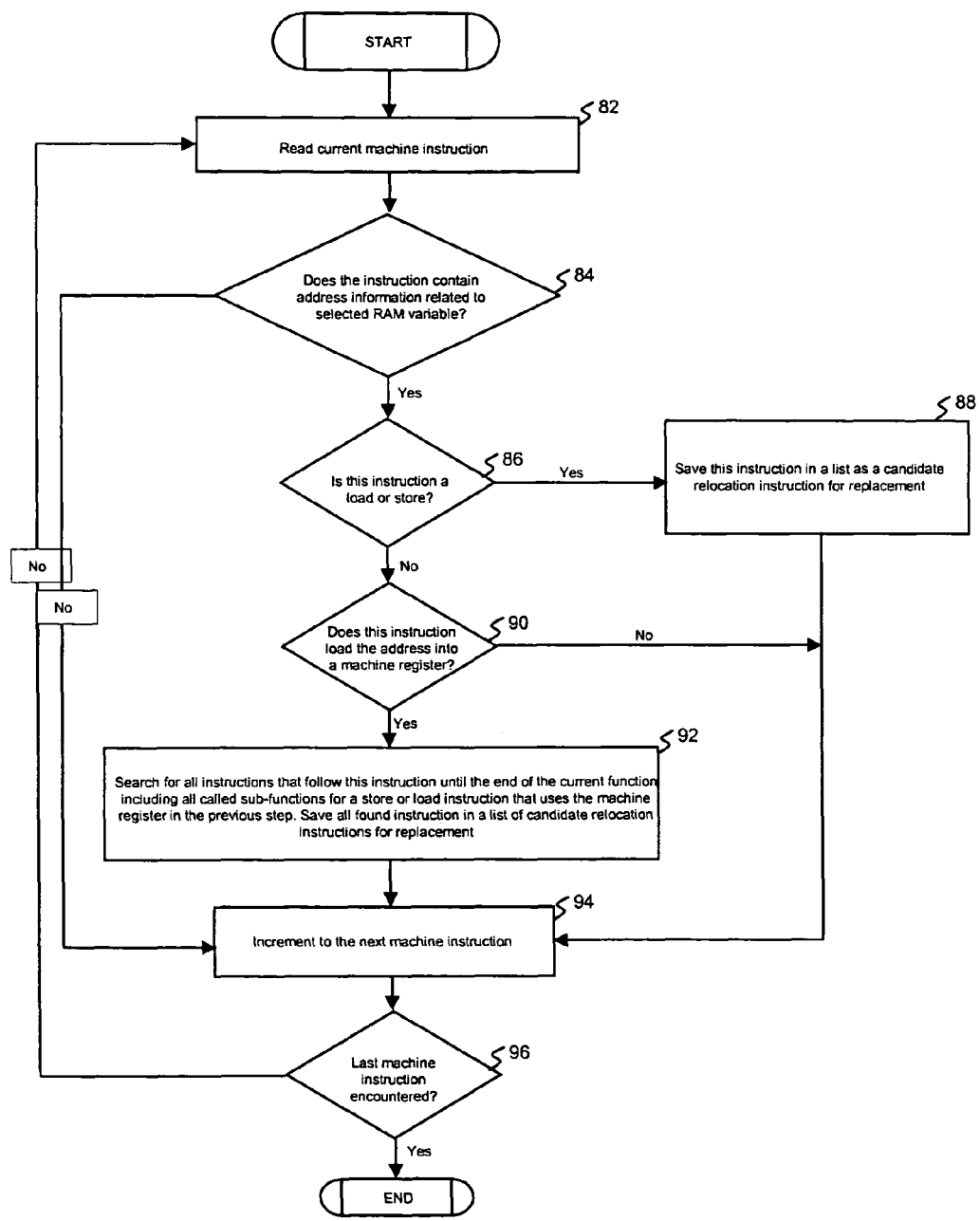
FIG. 5 is a diagram depicting exemplary logic to determine relocation instructions.

An exemplary algorithm employed by the instruction locator is further described in relation to FIG. 5. Briefly, the algorithm searches for machine instructions that contain addressing information related to the given ROM parameters. To begin, a first machine instruction residing in the program executable is read at step 82. For each machine instruction, a determination is made at step 84 as to whether the instruction contains address information related to the desired ROM parameter. Some examples of instructions that may contain addressing information for a PowerPC microcontroller are the addi, ori, stfs, and ldfs instructions. However, it is readily understood that other instructions which contain address information are within the scope of the present invention. In addition, one readily skilled in the art will appreciate that more than one machine instruction may be used to determine addressing information for the desired ROM parameter. For example, in a PowerPC-based microcontroller an addis instruction followed by an ori instruction can be used to load an address into a machine register.

When the current instruction contains address information for the desired ROM parameter, a determination is then made at step 86 as to whether the current instruction is a load instruction. If the current instruction contains address information for the desired ROM parameter and is a load instruction, then the instruction is saved in a list as a candidate instruction for replacement as shown at step 88. On the other hand, when the current instruction does not contain information for the desired ROM parameter, processing continues with the next machine instruction as shown at step 94.

When the current instruction contains address information for the desired ROM parameter, but is not a load instruction, then a determination is made at step 90 as to whether the instruction loads an address for the ROM parameter into a processor register. If the instruction does load the address, then processing proceeds as follows. Every machine instruction contained in the current function and all possible called functions following the instruction that load the address into the machine register are read and evaluated at step 92. Each instruction identified as a load instruction that uses the given register is again saved in the list of candidate instructions. Processing then continues with the next machine instruction at step 94 until the last instruction of the program is encountered.

While the invention has been described in its presently preferred form, it will be understood that the invention is capable of modification without departing from the spirit of the invention as set forth in the appended claims.

What is claimed is:

1. A method for controlling the value of a read only memory (ROM) parameter inside an executable software program, comprising:
   presenting a software program in executable form and having a plurality of machine instructions of a finite quantity of fixed lengths;
   selecting a parameter of interest used by the software program, wherein the parameter of interest is stored in read only memory (ROM);
   identifying a machine instruction that loads the parameter of interest into a machine register;
   evaluating each machine instruction in the executable form of the software program nested under the identified machine instruction to further identify machine instructions that use the machine register;
   replacing an identified machine instruction in the executable form of the software program with a branch instruction that references an address outside an address space of the software program;
   defining a set of relocated instructions at the address referenced by the branch instruction, wherein the set of relocated instructions reads a desired value for the parameter of interest and stores the desired value in a machine register where the parameter of interest is read into; and
   executing the executable form of the software program having the branch instruction.

2. The method of claim 1 further comprises replacing machine instructions identified as a load instruction with a branch instruction.

3. The method of claim 2 wherein the step of replacing machine instructions further comprises inserting the branch instruction into a program memory image of the software program at the address.

4. A computer-implemented calibration system for controlling read only memory (ROM) parameters of a software program in an executable form and having a plurality of machine instructions of a finite quantity of fixed lengths embedded in a microprocessor, comprising:
   an instruction locator embodied as computer executable instructions on a non-transitory computer readable medium, wherein the instruction locator is operable to select a parameter of interest used by the software program, wherein the parameter of interest is stored in read only memory (ROM), identify a machine instruction that loads the parameter of interest into a machine register, and evaluate each machine instruction in the executable form of the software program nested under the identified machine instruction to further identify machine instructions that use the machine register; and
   an instruction replacement component embodied as computer executable instructions on a non-transitory computer readable medium and in data communication with the instruction locator, wherein the instruction replacement component is operable to receive a branch instruction that references an address outside an address space of the software program, replace an identified machine instruction in the executable form of the software program with the branch instruction, and generate a set of relocation instructions, such that the branch instruction passes processing control to the set of relocation instructions, wherein the set of relocation instructions reads a desired value for the parameter of interest and stores the desired value in a machine register where the parameter of interest is read into.

5. The computer-implemented calibration system of claim 4 wherein the instruction replacement component is further operable to insert the branch instruction into a program memory image of the software program at the address.

6. The computer-implemented calibration system of claim 4 wherein the instruction replacement component is further operable to insert the set of relocation instructions in a memory space of the microprocessor that resides outside of an address space for the software program.

* * * * *